June 9, 1964 J. HOCHBERG 3,136,680

POLYTETRAFLUOROETHYLENE COPPER LAMINATE

Filed Aug. 15, 1960

INVENTOR
JEROME HOCHBERG

BY John [signature]
ATTORNEY

United States Patent Office 3,136,680

Patented June 9, 1964

3,136,680
POLYTETRAFLUOROETHYLENE COPPER LAMINATE

Jerome Hochberg, Newburgh, N.Y., assignor to E. I. du Pont de Nemours and Company, Wilmington, Del., a corporation of Delaware Filed Aug. 15, 1960, Ser. No. 49,814
7 Claims. (Cl. 161—189)

Figure 1:
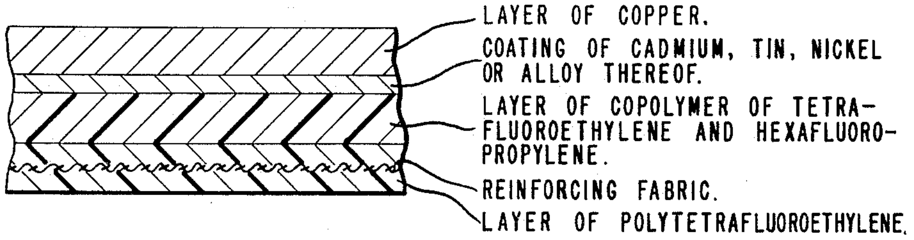

This invention relates to laminates, and more particularly to laminates comprising a layer of coated copper adhered to a layer of polytetrafluoroethylene.

In recent years increasing use has been made of printed circuits, and particularly of printed copper circuits. However, conventional substrates used for such circuits, for example, molded phenol-formaldehyde resin substrates and the like, have had several deficiencies. First, conventional substrates used for such printed circuits have relatively poor heat resistance. Not only does this poor heat resistance limit the operating conditions of the circuits but, in addition, makes it difficult to solder leads and the like thereto. Also, conventional substrates have high dielectric constants and dissipation factors and, particularly in high frequency uses, printed circuits thereof exhibit high power losses.

An excellent candidate to fill the aforementioned need for a better substrate for printed copper circuits is polytetrafluoroethylene which, because of its outstanding chemical, high temperature and electrical properties, has found a wide use in recent years. However, heretofore, it has been extremely difficult to adhere copper to polytetrafluoroethylene.

The subject invention provides laminates, which comprise at least one layer of copper bonded to at least one layer of polytetrafluoroethylene, which have outstanding interlayer adhesion and are eminently useful for, among other things, printed circuits.

The laminates of this invention comprise at least three layers, these layers comprising a layer of polytetrafluoroethylene, an intermediate layer in adherent contact with the layer of polytetrafluoroethylene, and, in adherent contact with the intermediate layer, a layer of copper, the surface of the layer of copper in adherent contact with the intermediate layer being coated with one of the class consisting of cadmium, nickel tin and alloys thereof and the intermediate layer comprising a copolymer of about from 95 to 50, and preferably about from 90 to 70 parts by weight of tetrafluoroethylene and about from 5 to 60 and preferably 10 to 30 parts by weight of hexafluoropropylene. The laminates of this invention are prepared by forming an assembly comprising at least three layers, these layers comprising a layer of polytetrafluoroethylene, an intermediate layer of the aforementioned copolymer of tetrafluoroethylene and hexafluoropropylene in contact with the layer of polytetrafluoroethylene, and, in contact with the intermediate layer, a layer of copper, the surface of the layer of copper in contact with the intermediate layer being coated with one of the class consisting of cadmium, nickel, tin and alloys thereof, and heating said assembly at a temperature between about the fusion temperature of the aforementioned copolymer and about 750° F., and preferably 650 to 700° F. for about from 60 to 0.5 minutes, and preferably about from 5 to 1 minutes under a pressure of up to about 600 pounds per square inch, and preferably about from 100 to 400 pounds per square inch.

Figure 2:
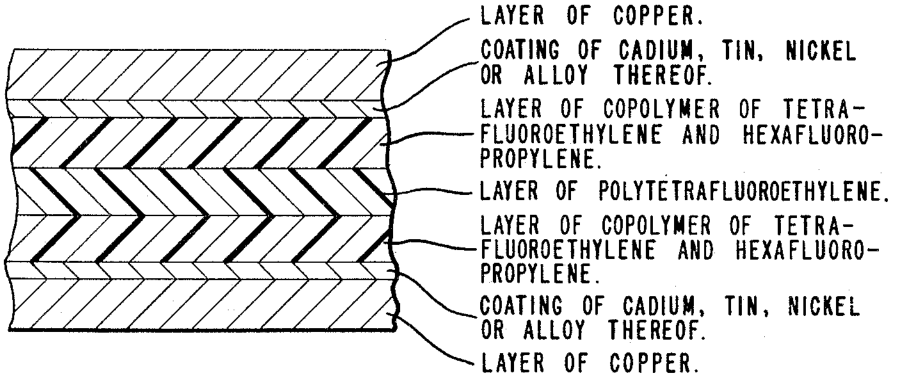

FIGURES 1 and 2 in the accompanying drawing are enlarged cross-sectional views of representative products of this invention.

The layer of polytetrafluoroethylene used in the products of this invention usually is a sheet or film; however, it can be a block, tube or other shaped structure. It can be rigid, semi-rigid or flexible and reinforced or unreinforced. A preferred structure comprises one or a plurality of plies of polytetrafluoroethylene reinforced with glass, asbestos, metal or other heat-resistant woven or non-woven fabric. U.S. Patent No. 2,539,329 shows one method for making such structures by coating or coating and impregnating a glass or another inorganic fabric with polytetrafluoroethylene. Multi-ply structures of such coated or coated and impregnated fabric or of unreinforced sheets of polytetrafluoroethylene can be formed by, for example, heating an assembly thereof under a pressure on the order of 100 to 600 pounds per square inch, at a temperature of about 650 to 800° F. for about from 20 to 0.5 and preferably 1 to 5 minutes, then cooling the resulting product under similar pressures to prevent wrinkling.

Usually, although not necessarily, the copper layer is in the form of a sheet or foil on the order of about 0.1 to 10, and preferably about 1 to 5 mils thick. The copper layer is coated on one or both surfaces with at least one of the class consisting of cadmium, nickel, tin and alloys thereof. The coating preferably contains at least about 80 to 90% of the aforementioned metals. Alloys of tin and nickel, for example, containing about from 50 to 90% by weight of tin and about from 50 to 10% by weight of nickel, are particularly preferred because products formed therewith have an optimum uniformity of interlayer adhesion. The copper can be coated by any of the conventional procedures such as, for example, electroplating, vacuum deposition, hot dipping and the like. The quantity of tin, nickel, cadmium or a mixture thereof deposited on the copper should be sufficient to form a continuous film, usually is about from 0.01 to 1 mil thick, and preferably is about from 0.1 to 0.5 mil thick.

The intermediate layer disposed between the polytetrafluoroethylene layer and a coated surface of the copper layer comprises at least one of the aforementioned copolymers of tetrafluoroethylene and hexafluoropropylene. These polymers fuse within the range of about from 275 to 325° C. Polymers of this general type, which are described, for example, in U.S. Patent No. 2,549,935, can be prepared, for example, by aqueous copolymerization of tetrafluoroethylene and hexafluoropropylene at a pressure of 350 to 400 pounds per square inch gauge at a temperature of about 75 to 80° C. for about from 1 to 3 hours in the presence of a persulfate catalyst such as ammonium persulfate. If desired, the intermediate layer, like the polytetrafluoroethylene layer, can be reinforced with heat-resistant woven or non-woven fabric.

Conventional heat-resistant additives such as pigments and fillers can be added, if desired, to one or both of the copolymer layer and polytetrafluoroethylene layer. Examples of pigments and fillers are titanium dioxide, metallic powders and finely divided glass, asbestos and mica.

The aforementioned layers are assembled, then heated and pressed. Although a single polytetrafluoroethylene layer, a single copolymer layer and a single copper layer can be used as shown in FIGURE 1, two or more of each of the aforementioned layers can often be employed advantageously. For example, as shown in FIGURE 2, a copper layer can be disposed on either side of a polytetrafluoroethylene substrate with a copolymer layer between each copper layer and the substrate. Such use of several copper layers yields a product capable, for example, of carrying more circuits per unit volume. Alternately, for example, in capacitors, it may be advantageous to laminate successively, a copolymer layer and a polytetrafluoroethylene layer to either side of a copper layer which has been coated on both sides with one of the aforementioned coating metals.

As stated hereinbefore, next the aforementioned assembly is heated at a temperature ranging about from the fusion temperature of the copolymer of tetrafluoroethylene and hexafluoropropylene to about 750° F., and preferably about from 650 to 700° F. for about from 0.5 to 60 minutes, and preferably 1 to 5 minutes at pressure of up to about 600 pounds per square inch. Usually, the longest times are used at lower temperatures and pressures. Laminating pressures as low as, for example, 5 to 10 pounds per square inch can be applied, for example, when vacuum lamination is used. Preferably, pressures on the order of 100 to 400 pounds per square inch are used. If desired, any two or more adjacent layers of a product of this invention can be laminated under the conditions described above then the resulting product laminated under similar conditions to the remainder of the elements of the desired structure.

Preferably, in order to insure against wrinkling, the products are cooled under pressures, for example, similar to those used in the lamination operation.

The products of this invention have outstanding interlayer adhesion which is many times that obtained when either the intermediate copolymer layer or the coating on the copper layer is omitted. They also have outstanding heat and chemical resistance. The products of this invention are outstandingly suitable for making printed circuits; however, they are also useful, for example, for printed commutators and other printed electrical parts and for capacitators. Printed circuits of the products of this invention have low power losses even at high frequencies. Also, the copper layer therein is readily solderable and easily etched.

In the following examples, which illustrate this invention, parts and percentages are by weight unless otherwise indicated.

*Example 1*

A reinforced sheet of polytetrafluoroethylene is prepared by repeatedly dipping a woven glass fabric in an aqueous suspensoid of polytetrafluoroethylene, drying the product after each dip, calendering the product after the final dip to remove any cracks therein and fusing the calendered coating at about 750° F. The glass fabric is about 2 mils thick, has a yarn size of 900½, a thread count of 60 x 47 and a weight of about 1.4 ounces per square yard. The coating of polytetrafluoroethylene on either side is about 1½ mils thick. Seven plies of the above reinforced polytetrafluoroethylene sheet material are laid one on top of the other and the resulting assembly is heated for about 5 minutes at 750° F. in a press at a pressure of 300 pounds per square inch gauge, then the press is cooled with water and the product held therein for 3 minutes at a pressure of 300 pounds per square inch to yield a rigid multi-ply layer of polytetrafluoroethylene. Copper foil about 2.5 mils thick is coated on one side with a 0.4-mil film of nickel-tin alloy, for example, containing 25 to 35% of nickel and 65 to 75% of tin. The foil can be coated by known electroplating techniques, for example, using a nickel chloride-stannus chloride electroplating bath containing a small portion of cobalt chloride and sufficient hydrochloric acid to lower the pH below about 1.0, a bath temperature of about 140° F. and a current density of about 30 amperes per square foot.

An assembly is prepared by laying a 2-mil film of a copolymer of 85% of tetrafluoroethylene and 15% of hexafluoropropylene on the aforementioned multi-ply layer of polytetrafluoroethylene and laying the tin-nickel coated copper foil over the copolymer layer. The resulting assembly is heated for 5 minutes at a temperature of 700° F. under a pressure of 150 pounds per square inch, then removed from the press, inserted in a cold press and held for 5 minutes under a pressure of 200 pounds per square inch.

The laminated product of this invention described above has a peel-bond strength of about 20 pounds per linear inch. Peel-bond strength is determined by delaminating the coated copper foil layer from the intermediate copolymer layer at one end of a 1-inch wide strip of the laminate, then pulling the foil back along the strip parallel to the surface thereof at a rate of about 2 inches per minute. The peel-bond strength is the force necessary to so delaminate the product. If the procedure described above is repeated except that no tin-nickel coating is placed on the copper foil, the resulting product shows a peel-bond strength of less than about 4 pounds per inch. Similarly, if the aforementioned procedure is repeated except that the intermediate copolymer layer is omitted, adhesion of less than about 1 pound per inch is obtained.

The product described above is eminently suited for making printed circuits. Such circuits can be prepared, for example, by printing a protective coating, for example, of asphalt in the design of the circuit onto the copper foil, placing the printed product in a bath of ferric chloride or ammonium persulfate to etch therefrom the portions of the copper layer that have not been printed, and finally washing for resulting product and if desired, removing the protective coating.

*Example 2*

A 2.5-mil sheet of copper foil electroplated on each side with a 0.4-mil coating of cadmium is laid on top of a layer of a copolymer of 85% of tetrafluoroethylene and 15% of hexafluoropropylene. In turn, the copolymer layer is laid on a multi-ply reinforced polytetrafluoroethylene layer similar to that described in Example 1. The resulting assembly is inserted within an aluminum-foil envelope and the air therein is evacuated until the pressure is about 5 millimeters of mercury absolute. The evacuated envelope is inserted in an oven and held at 650° F. for one hour. Finally, the resulting product is removed from the oven and quenched in water. The product has a peel-bond strength of about 14 pounds per inch.

*Example 3*

An assembly is prepared by laying, successively, one on top of the other in a press, a layer of cadmium-plated copper foil similar to that used in the preceding example, a 2-mil layer of a copolymer of 85% of tetrafluoroethylene and 15% of hexafluoropropylene, a multi-ply polytetrafluoroethylene layer reinforced with glass fabric and similar to that described in Example 1, another layer of the aforementioned copolymer and finally another layer of the cadmium-plated copper foil. The resulting assembly is pressed for 3 minutes at 700° F. under a pressure of 360 pounds per square inch, inserted in a cold press and cooled 3 minutes under a pressure of 360 pounds per square inch. The resulting product has excellent interlayer adhesion.

*Example 4*

A 2-mil sheet of a copolymer of 80% of tetrafluoroethylene and 15% of hexafluoropropylene is laid on an unsupported 5-mil sheet of polytetrafluoroethylene and, on top of the copolymer layer, is laid a 2.5-mil sheet of copper foil plated on one side with a 0.4-mil coating of cadmium. The resulting laminate is heated for 4 minutes at a temperature of 680° F. and a pressure of 300 pounds per inch, then cooled for 3 minutes under a pressure of 300 pounds per square inch gauge to yield a product of this invention having a peel-bond strength on the order of 10 to 15 pounds per inch.

Similar results are obtained when copper foil plated with nickel or tin is substituted for the cadmium plated copper used above.

I claim:

1. A laminate which comprises at least three layers, said layers comprising a layer of polytetrafluoroethylene, an intermediate layer in adherent contact with said layer of polytetrafluoroethylene and, in adherent contact with said intermediate layer, a layer of copper, the surface of said layer of copper in adherent contact with said intermediate layer being adherently coated with at least one of the class consisting of cadmium, nickel, tin and alloys of the latter three metals containing at least 80% by weight of said metals thereof and said intermediate layer comprising a copolymer of about from 95 to 50 parts by weight of tetrafluoroethylene and about from 5 to 50 parts by weight of hexafluoropropylene.

2. A laminate which comprises at least three layers, said layers comprising a layer of polytetrafluoroethylene, an intermediate layer in adherent contact with said layer of polytetrafluoroethylene and, in adherent contact with said intermediate layer, a layer of copper, the surface of said layer of copper in adherent contact with said intermediate layer being adherently coated with at least one of the class consisting of cadmium, nickel, tin and alloys of the latter three metals containing at least 80% by weight of said metals thereof and said intermediate layer comprising a copolymer of about from 90 to 70 parts by weight of tetrafluoroethylene and about from 10 to 30 parts by weight of hexafluoropropylene.

3. A laminate of claim 2 wherein said layer of polytetrafluoroethylene comprises at least one ply of polytetrafluoroethylene reinforced with woven glass fabric.

4. A laminate of claim 2 wherein said layer of copper is coated with an alloy of about from 50 to 90% by weight of tin and about from 50 to 10% by weight of nickel.

5. A laminate of claim 2 wherein said layer of copper is coated with cadmium.

6. A process which comprises forming an assembly comprising at least three layers, said layers comprising a layer of polytetrafluoroethylene, an intermediate layer in contact with said layer of polytetrafluoroethylene and, in contact with said intermediate layer, a layer of copper, the surface of said layer of copper in contact with said intermediate layer being adherently coated with one of the class consisting of cadmium, nickel, tin and alloys of the latter three metals containing at least 80% by weight of said metals thereof and said intermediate layer comprising a copolymer of about from 95 to 50 parts by weight of tetrafluoroethylene and about from 5 to 50 parts by weight of hexafluoropropylene and heating said assembly at a temperature between about the fusion temperature of said copolymer and about 750° F. for about from 60 to 0.5 minutes at a pressure up to about 600 pounds per square inch.

7. A process of claim 6 wherein said assembly is heated at a temperature of about from 650 to 700° F. for about from 1 to 5 minutes under a pressure of about from 100 to 400 pounds per square inch.

References Cited in the file of this patent

UNITED STATES PATENTS

| | | |
|---|---|---|
| 2,539,329 | Sanders | Jan. 23, 1951 |
| 2,700,212 | Flynn et al. | Jan. 25, 1955 |
| 2,833,686 | Sandt | May 6, 1958 |
| 2,955,974 | Allen et al. | Oct. 11, 1960 |